United States Patent

Jha

[19]

[11] Patent Number: 5,905,619
[45] Date of Patent: May 18, 1999

[54] ARC FAULT DETECTION SYSTEM

[75] Inventor: Kamal N. Jha, Bethel Park, Pa.

[73] Assignee: The United States of America as represented by the United States Department of Energy, Washington, D.C.

[21] Appl. No.: 08/951,026

[22] Filed: Oct. 15, 1997

[51] Int. Cl.$^6$ .................................................. H02H 3/00
[52] U.S. Cl. .............................. 361/93; 361/42; 361/78; 361/115
[58] Field of Search ................................. 361/42, 45, 49, 361/78, 93, 115

[56] References Cited

U.S. PATENT DOCUMENTS 5,224,006  6/1993  MacKenzie et al. ...................... 361/42

OTHER PUBLICATIONS

Type 87M Three Phase Percentage Differential Relay, ABB, Asea Brown Boveri, Bulletin 7/6/1–1D.

Primary Examiner—Jeffrey Gaffin
Assistant Examiner—Stephen Jackson
Attorney, Agent, or Firm—John T. Lucas; William R. Moser; Paul A. Gottlieb

[57] ABSTRACT

An arc fault detection system for use on ungrounded or high-resistance-grounded power distribution systems is provided which can be retrofitted outside electrical switchboard circuits having limited space constraints. The system includes a differential current relay that senses a current differential between current flowing from secondary windings located in a current transformer coupled to a power supply side of a switchboard, and a total current induced in secondary windings coupled to a load side of the switchboard. When such a current differential is experienced, a current travels through a operating coil of the differential current relay, which in turn opens an upstream circuit breaker located between the switchboard and a power supply to remove the supply of power to the switchboard.

3 Claims, 1 Drawing Sheet

ARC FAULT DETECTION SYSTEM

BACKGROUND OF THE INVENTION

1. Field of the Invention

The present invention relates to detection systems for detecting arcing faults occurring in the electrical circuits, and in particular, to a detection system for detecting and preventing arcing faults in the electrical switchboards in ungrounded or high-resistance grounded power distribution systems.

2. The Prior Art

An arcing fault in an electrical switchboard can burn the switchboard and propagate the arc into adjacent switchboards or eject hot plasma into the manned spaces. These arcing faults are caused by dirt, moisture, loose connections, or the like and are essentially high-impedance phase-to-phase faults that are not quickly detected by modern day circuit breakers.

The Johns Hopkins University, Applied Physics Laboratory has developed an arc fault detection (AFD) system for detecting and preventing arcing faults in switchboards. The AFD system detects arcing faults within switchboards using optical and differential pressure sensors installed in the switchboards After receiving signals from the optical and differential pressure sensors, the control unit of the AFD system trips open the appropriate upstream circuit breaker. However, it has been found that in many switchboards, optical and differential pressure sensors cannot be installed because of inadequate space, and because of the presence of ventilating louvers and wide openings for cable entry. Such ventilating louvers and wide openings for cable entry can prevent pressure build-up inside the switchboards, making differential pressure sensors, and hence the AFD system, ineffective.

SUMMARY OF THE INVENTION

Because of the problems discussed above, the need exists to provide an arc fault detection system that can be retroactively fitted to electrical circuits that have inadequate space internally. A key aspect of the arc fault detection system is that it can be retrofitted outside an existing electrical circuit. Such existing electrical circuits comprise a power source electrically connected to a switchboard, which is, in turn, electrically connected to at least one load. The arc fault detection system comprises: a circuit breaker electrically connected between the power source and the switchboard; a control power source for a differential current relay; a source current transformer coupled to the electrical circuit between the circuit breaker and the switchboard, a differential current relay being electrically connected to at least one load current transformer, and to said breaker such that when said differential current relay determines a difference between a load current in said electrical connection between said load current transformer and said differential current relay, and between a source current in said electrical connection between said source current transformer and said differential current relay, said differential current relay opens said breaker which breaks said electrical connection between said power source and said switchboard such that no power from said power supply is provided to said switchboard.

Preferably, the source current transformer, the differential current relay, and the load current transformers are connected in parallel.

Advantageously, the differential current relay of the arc fault detection system further comprises two restraining coils serially connected to each other along the top lead line and an operating coil is connected in parallel to the current transformers between the top and bottom lead lines, said operating coil being disposed between the restraining coil such that during normal operation, no current flows through said operating coil, yet when an arc fault occurs within the existing electrical circuit an operating current flows through the operating coil so as to actuate the differential current relay to open the breaker and break the electrical connection between the power supply and the switchboard.

Other features and advantages of the invention will be set forth in, or apparent, from the following detail description of the preferred embodiment of the invention.

BRIEF DESCRIPTION OF THE DRAWINGS

The single FIGURE in the drawings is a schematic view of the coupling of the arc fault detection system and the existing electrical circuit.

DESCRIPTION OF THE PREFERRED EMBODIMENTS

Figure 1:
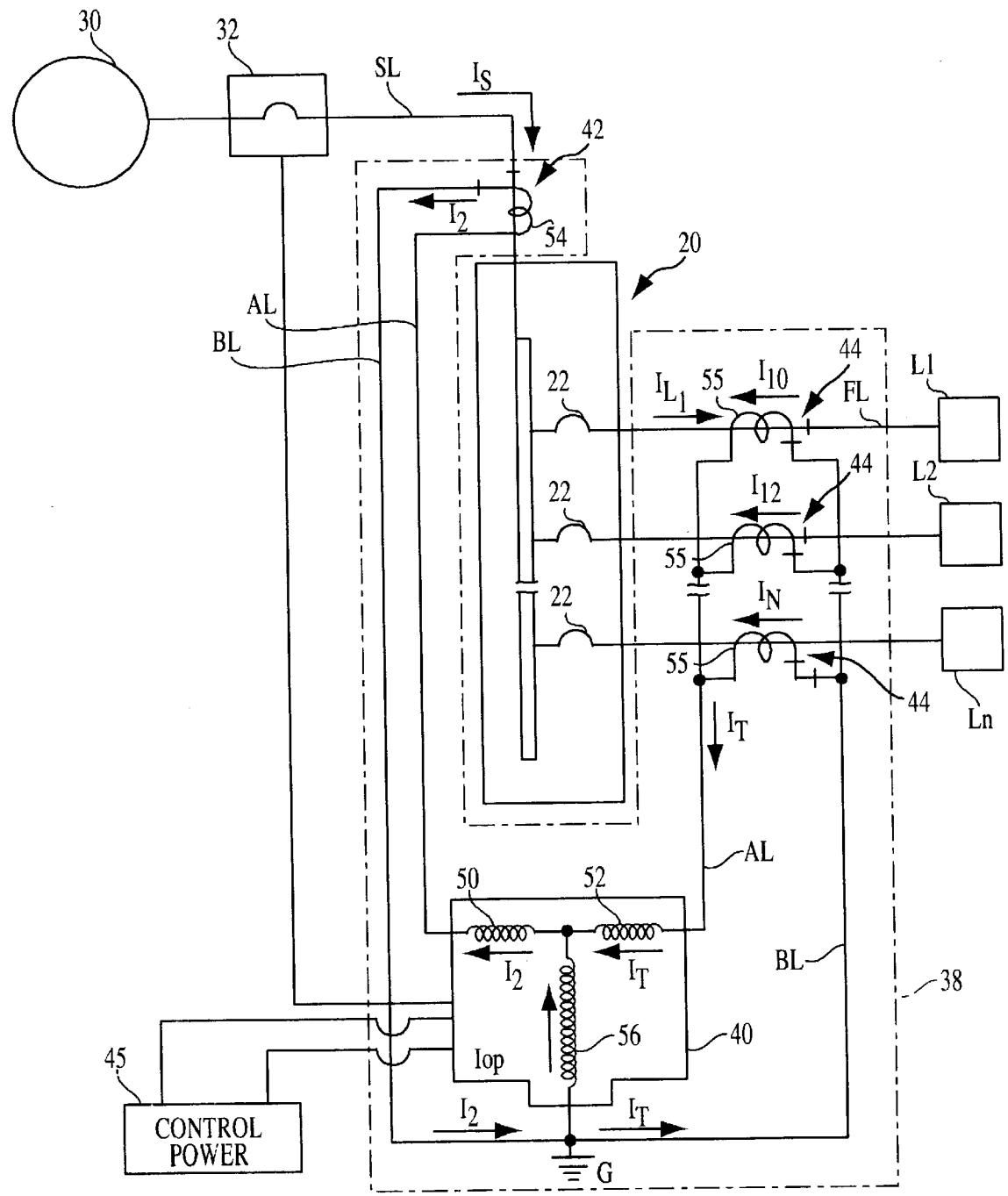

The single FIGURE in the drawings illustrates a switchboard 20 having a plurality of parallel-connected switches 22 connected in feeder lines FL which electrically connect a power supply 30 to a corresponding plurality of individual loads denoted loads L1, L2 . . . Ln. Switchboard 20 could, of course, be connected to any number or combination of single phase or three phase loads, although only load L1 will be discussed below as exemplary. A circuit breaker 32 is connected between switchboard 20 and power supply 30, and is operatively connected to a differential current relay, generally denoted 40, forming part of the fault detection system of the inventor and described in greater detail below, such that when differential current relay 40 senses a current differential, circuit breaker 32 is switched from a closed position to an open position thereby effectively breaking the electrical connection between power supply 30 and switchboard 20. When switches 22 and circuit breaker 32 are closed, a current $I_S$ passes through switchboard 20 so that current is supplied to loads L1 . . . Ln. By way of example, current $I_S$ passing through switchboard 20 results in a current $IL_1$ being to load L1.

The alternating current (AC) arc fault detection system of the invention, which is generally denoted 38, is installable outside switchboard 20 which advantageously enables the detection system to be retrofitted to many circuits having inadequate space. As described in more detail below, the AC arc fault detection system 38 is operatively connected to the standard configuration mentioned above between circuit breaker 32 and switchboard 20, and between switchboard 20 and loads L1 . . . Ln.

Considering, the arc fault detection system 38 more specifically, device 38 includes, as mentioned above, the differential current relay 40 which is electrically connected to a source current transformer 42 in parallel between a first connector AL and a second connector BL of transformer 42. Source current transformer 42 is disposed between circuit breaker 32 and switchboard 20 such that any current $I_S$ to switchboard 20 induces a secondary current $I_2$ in the second connector. Differential current relay 40 is also electrically connected in parallel with a plurality of load current transformers 44 connected between connectors AL and BL. Differential current relay 40 is also electrically connected to a control power source 45 in such a way that is typical so that differential current relay 40 can operate as discussed below.

Differential current relay 40 includes a pair restraining coils 50 and 52 which are connected in series in first connector AL. Connected in shunt with the junction between the current transformers 42 and 44 is an operating coil 56. In other words, coil 56 is electrically connected to the first connector AL between the restraining coils 50, 52 and electrically connected to the second connector BL.

The current transformers 42 and 44 comprise secondary windings 54 and 55, respectively. Secondary windings 55 are connected in parallel, and this parallel combination is connected in series with secondary winding 54. Each current transformer 42,44 has the same ratio between primary and secondary windings.

Under normal operating conditions, the sum of currents in the feeder lines FL on the load side must equal the current $I_S$ in the supply line SL. As a result, the sum of the secondary currents, $I_{10}+I_{12}+I_N=I_T$ induced in the secondary windings 55 of load current transformers 44 must equal the secondary current $I_2$ induced in the secondary windings 54 of supply current transformer 42. Therefore, under normal operating conditions, when the secondary current $I_2$ flowing from the source current transformer 42 into the differential current relay 40 equals the sum secondary currents $I_T$ flowing from the load current transformers 44 into the differential current relay 40, no current flows through the operating coil 56 ($I_{op}=I_2-I_T=0$). Therefore, circuit breaker 32 remains closed so that power continues to be supplied to switchboard 20 from power supply 30.

However, when arcing faults occur in the switchboard 20, such as a high-impedance phase-to-phase fault, on the supply side of the switchboard, the power supply 30 supplies this fault with current. As a result, the secondary current $I_2$ induced in the source current transformer 42 is higher than the sum of the secondary currents $I_T$ induced in the secondary windings 55 of the load current transformers 44. This unequal flow of current into the differential current relay 40 generates a differential current $I_{op}$ through operating coil 56 which is sufficient to close contacts in the trip circuit of circuit breaker 32, opening the circuit breaker, and thus removing the power being supplied to switchboard 20 from power supply 30.

The differential current relay 40, and its operative connection to circuit breaker 32, can provide a standard operative connection such that when current $I_{op}$ flows through operating coil 56, this closes contacts in the trip circuit of circuit breaker 32 to energize the shunt trip device of circuit breaker 32 which, in turn, causes rotation of the tripper bar within circuit breaker 32 opening circuit breaker 32. Of course, relay 40, circuit breaker 32, and/or the operative coupling there between can be of other suitable, conventional implementation.

It will be appreciated that operation of the differential current relay 40 also results if an arcing fault occurs in switchboard 20 and is fed from both the power supply 30 and the load $L_1$, e.g., if motors are connected as load $L_1$. In this case, the direction of currents in the secondary windings 55 of the load current transformers 44 is opposite to that shown illustrated, but would still result in significant current flow in the operating coil 56 of the differential current relay 40. As stated above, a current flow in the operating coil 56 of the differential current relay 40 results in the opening of upstream circuit breaker 32 to prevent the power being supplied to the arcing fault.

Although the present invention has been described to specific exemplary embodiments thereof, it will be understood by those skilled in the art that variations in modifications can be affected in these exemplary embodiments without departing from the scope and spirit of the invention.

What is claimed is:

1. An arc fault detection system, installable outside an existing electrical circuit, for protecting said circuit, said circuit comprising a power source, at least one load, a switchboard connected between said power source and said at least one load, said arc fault detection system comprising:

a circuit breaker electrically connected between said power source and said switchboard;

a source current transformer coupled to said circuit between said breaker and said switchboard for sensing source current;

at least one load current transformer coupled to said circuit between said switchboard and said at least one load for sensing load current;

a differential current relay connected to said source current transformer and said load current transformer and coupled to said circuit breaker such that when said differential current relay detects a difference between the load current sensed by said load current transformer, and the source current sensed by said source current transformer, said differential current relay opens said circuit breaker to break the electrical connection between said power source and said switchboard and thus prevent power from being supplied from said power supply to said switchboard; and a control power source connected to said differential current relay for powering said differential current relay.

2. An arc fault detection system as in claim 1, wherein said differential current relay comprises:

first and second restraining coils connected in series, and an operating coil for said circuit breaker connected to a junction point between said retraining coils in parallel with said current transformers such that during normal operation, no current flows through said operating coil, and, when an arc fault occurs within said existing electrical circuit, an operating current flows through said operating coil so as to cause said operating coil to open said circuit breaker.

3. An arc fault detection system, installable outside an existing electrical circuit, for protecting said circuit, said circuit comprising a power source and a load, said arc fault detection system comprising:

a circuit breaker electrically connected between said power source and said load;

a source current transformer coupled to said circuit between said breaker and said load for sensing source current;

a load current transformer coupled to said circuit between said power source and said load for sensing load current;

a differential current relay connected to said source current transformer and said load current transformer and coupled to said circuit breaker such that when said differential current relay detects a difference between the load current sensed by said load current transformer, and the source current sensed by said source current transformer, said differential current relay opens said circuit breaker to break the electrical connection at a point between said power source and said load; said differential current really comprising first and second restraining coils connected in series, and an operating coil for said circuit breaker connected to a junction point between said retaining coils in parallel with said current transformers such that during normal operation, no current flows through said operating coil, and, when a arc fault occurs within said existing electrical circuit, an operating current flows through said operating coil so as to cause said operating coil to open said circuit breaker, and a control power source connected to said differential current relay for powering said differential current relay.

* * * * *